United States Patent
Ben Artsi et al.

(10) Patent No.: US 9,124,461 B2
(45) Date of Patent: Sep. 1, 2015

(54) METHOD AND APPARATUS FOR REDUCING JITTER

(75) Inventors: Liav Ben Artsi, Nahariya (IL); Ido Bourstein, Pardes Hana (IL)

(73) Assignee: Marvell Israel (M.I.S.L) Ltd., Yokneam (IL)

(*) Notice: Subject to any disclaimer, the term of this patent is extended or adjusted under 35 U.S.C. 154(b) by 393 days.

(21) Appl. No.: 13/548,766

(22) Filed: Jul. 13, 2012

(65) Prior Publication Data
US 2013/0022134 A1  Jan. 24, 2013

Related U.S. Application Data

(60) Provisional application No. 61/509,008, filed on Jul. 18, 2011.

(51) Int. Cl.
H04B 3/00 (2006.01)
H04L 25/00 (2006.01)
H04L 25/03 (2006.01)

(52) U.S. Cl.
CPC .... H04L 25/03343 (2013.01); H04L 25/03878 (2013.01)

(58) Field of Classification Search
CPC ...... H04L 1/005; H04L 1/0054; H04L 1/0066
USPC .................................................. 375/257, 316
See application file for complete search history.

(56) References Cited

U.S. PATENT DOCUMENTS

| | | | | |
|---|---|---|---|---|
| 6,642,742 B1* | 11/2003 | Loyer | | 326/30 |
| 6,744,275 B2* | 6/2004 | Chansungsan | | 326/30 |
| 7,239,171 B1* | 7/2007 | Wang et al. | | 326/30 |
| 2004/0075462 A1* | 4/2004 | Kizer et al. | | 326/29 |
| 2005/0175355 A1* | 8/2005 | Hauenschild et al. | | 398/161 |
| 2005/0218927 A1* | 10/2005 | Shaikh et al. | | 326/30 |
| 2008/0107423 A1* | 5/2008 | Lee et al. | | 398/136 |
| 2012/0275279 A1* | 11/2012 | Wilson et al. | | 369/13.24 |

* cited by examiner

*Primary Examiner* — Freshteh N Aghdam

(57) ABSTRACT

Aspects of the disclosure provide a method. The method includes causing a voltage level of a signal transmitted on a transmission line to be non-linearly modified to reduce a voltage variation at a target level, and providing the modified signal to a receiving circuit that is disposed on the transmission line. In an embodiment, the method includes causing the voltage level of the signal transmitted on the transmission line to be non-linearly modified to reduce a first voltage variation at a first target level corresponding to a first digital value and to reduce a second voltage variation at a second target level corresponding to a second digital value.

20 Claims, 7 Drawing Sheets

METHOD AND APPARATUS FOR REDUCING JITTER

INCORPORATION BY REFERENCE

This present disclosure claims the benefit of U.S. Provisional Application No. 61/509,008, "Termination of High Speed DDR Signals," filed on Jul. 18, 2011, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

During digital signal transmission, signal integrity can be affected by various noise sources, such as reflection noise, crosstalk noise and the like, and may cause data errors at a receiver side. In an example, the reflection noise and crosstalk noise introduce high amount of jitter during digital signal transmission. The high amount of jitter reduces timing margin for data sampling at the receiver side, and thus can cause receiving data errors in high data rate transmission.

SUMMARY

Aspects of the disclosure provide a method. The method includes causing a voltage level of a signal transmitted on a transmission line to be non-linearly modified to reduce a voltage variation at a target level, and providing the modified signal to a receiving circuit that is disposed on the transmission line. In an embodiment, the method includes causing the voltage level of the signal transmitted on the transmission line to be non-linearly modified to reduce a first voltage variation at a first target level corresponding to a first digital value and to reduce a second voltage variation at a second target level corresponding to a second digital value.

In an example, the method includes clipping the voltage level of a predetermined voltage value at the target level. In another example, the method includes reducing an impedance to modify the voltage level of the signal at the target level.

According to an embodiment of the disclosure, the method includes using at least one of a diode and a transistor to cause the voltage level of the signal to be non-linearly modified.

According to an aspect of the disclosure, the method includes using a circuit disposed with the receiving circuit on an integrated circuit chip to cause the voltage level of the signal to be non-linearly modified. According to another aspect of the disclosure, the method includes using a circuit disposed outside of an integrated circuit chip to cause the voltage level of the signal to be non-linearly modified.

Aspects of the disclosure provide a circuit. The circuit includes a receiving circuit and a non-linear reshape component. The receiving circuit is configured to receive a signal transmitted on a transmission line. The non-linear reshape component is configured to cause a voltage level of the signal to be non-linearly modified to reduce a voltage variation at a target level.

In an embodiment, the non-linear reshape component includes a voltage source coupled with a diode/transistor to clip the voltage level of a predetermined voltage value at the target level.

In another embodiment, the non-linear reshape component is configured to reduce an impedance to modify the voltage level at the target level. In an example, the non-linear reshape component includes at least one of a diode and a diode-connected transistor configured to have an impedance as a function of a voltage drop.

According to an aspect of the disclosure, the non-linear reshape component and the receiving circuit are disposed on an integrated circuit chip. According to another aspect of the disclosure, the receiving circuit is disposed on an integrated circuit chip and the non-linear reshape component is disposed outside of the integrated circuit chip.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1A:
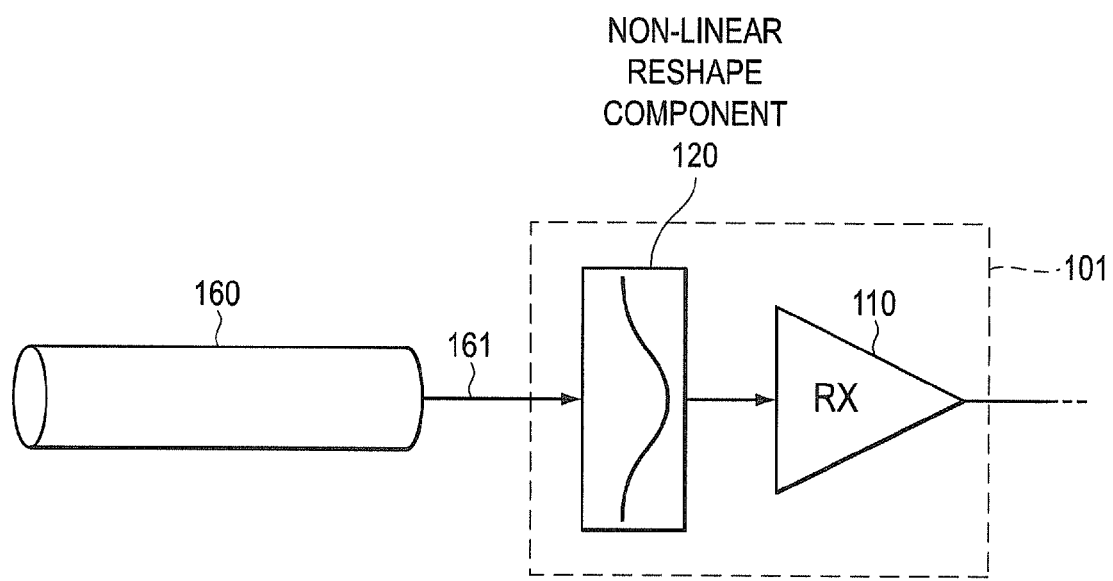
FIG. 1A shows a block diagram of an interface circuit 101 coupled with a transmission line 160 according to an embodiment of the disclosure.

FIG. 1A shows a block diagram of an interface circuit 101 coupled with a transmission line 160 according to an embodiment of the disclosure. The interface circuit 101 receives a signal 161 transmitted by the transmission line 160. The interface circuit 101 includes a receiving circuit 110 and a non-linear reshape component 120 located in front of the receiving circuit 110. The non-linear reshape component 120 is configured to modify the voltage level of the signal 161 that enters the receiving circuit 110 and thus reshape the waveform of the signal 161.

In an embodiment, the transmission line 160 includes a printed metal wire on a printed circuit board (PCB). Further, in an example, the transmission line 160 includes any suitable conductive media that couple the printed metal wire and the interface circuit 101, such as solder ball, bonding wire, solder bump, on-chip wire, and the like. In an example, the signal 161 transmitted by the transmission line 160 is a digital signal that a voltage level of the signal 161 at a time corresponds to a digital number. In an example, the voltage level of the signal 161 corresponds to a binary bit. For example, a relatively high voltage level corresponds to a binary "1", and a relatively low voltage level corresponds to a binary "0". Thus, the signal 161 transmits a binary stream in a waveform that the voltage level of the waveform varies over time between an upper peak having the relatively high voltage level and a lower peak having the relatively low voltage level.

The peak voltages of the signal 161 often vary due to transmission noise, such as reflection noise, crosstalk noise, and the like. The variation of the peak voltages causes jitter in the signal 161, and reduces an available timing margin for further processing in the receiving circuit 110, for example.

According to an aspect of the disclosure, the non-linear reshape component 120 is configured to non-linearly modify the voltage level of the signal 161 and thus reshape the waveform of the signal 161. In an embodiment, the non-linear reshape component 120 applies a relatively large restriction to voltage change in the signal 161 when the voltage level of the signal 161 is in an upper peak zone near the upper peak. Further, the non-linear reshape component 120 applies a relatively large restriction to voltage change in the signal 161 when the voltage level of the signal 161 is in a lower peak zone near the lower peak. When the voltage level of the signal 161 is out of both of the upper peak zone and the lower peak zone, the non-linear reshape component 120 applies a relatively low restriction, such as substantially no restriction, to voltage change in the signal 161.

In an example, the non-linear reshape component 120 clips the voltage level of the signal 161 near the upper peak and near the lower peak, and allows the signal 161 to pass without substantial restriction to voltage change when the voltage level is away from the upper peak and the lower peak. In another example, the non-linear reshape component 120 has a relatively small impedance to modify the voltage level of the signal 161 when the voltage level is near the upper peak or near the lower peak, and has relatively large impedance to reshape the voltage level of the signal 161 when the voltage level is away from the upper peak and the lower peak.

Figure 1B:
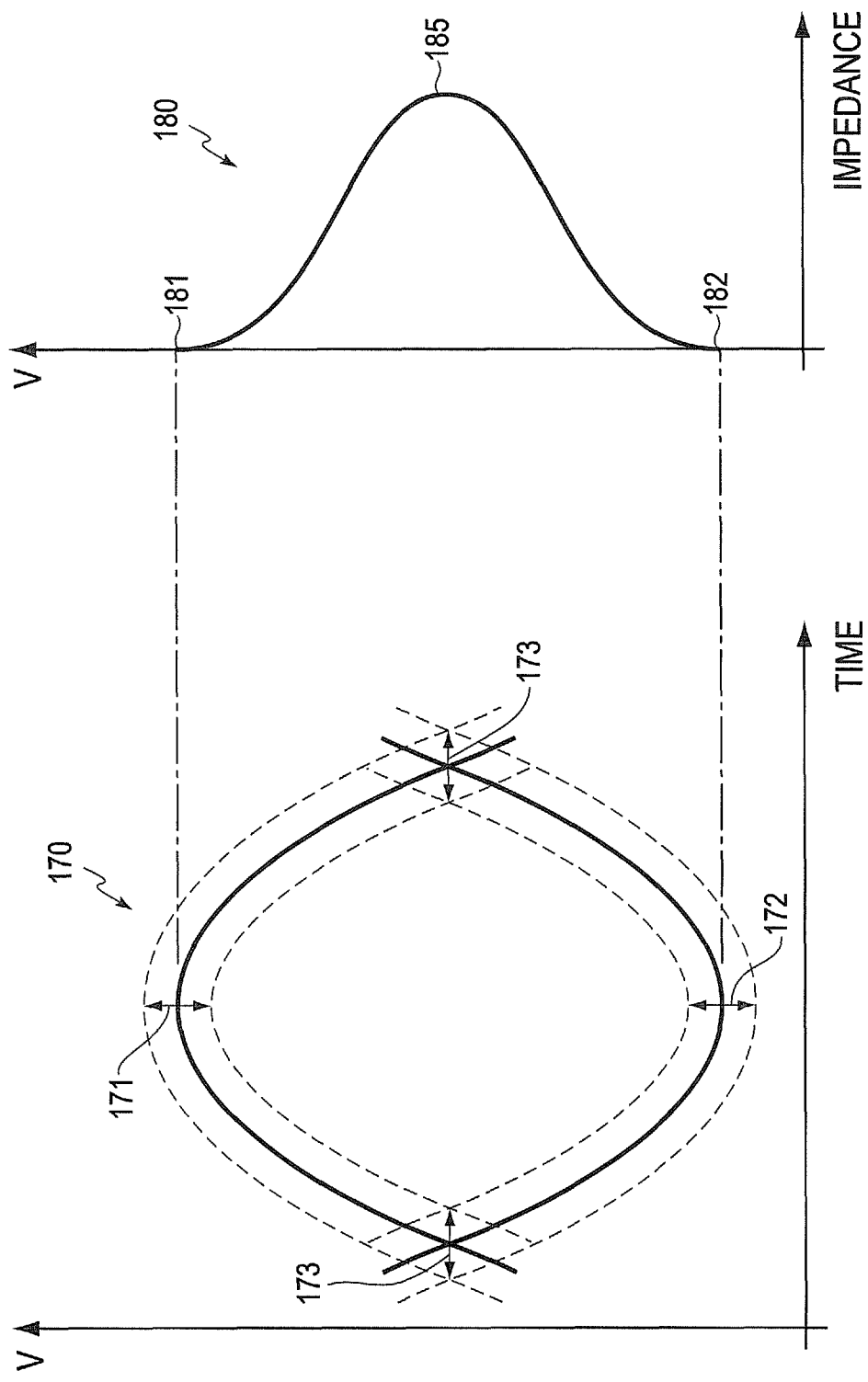
FIG. 1B shows a plot that illustrates jitter reduction using the interface circuit 101 according to an embodiment of the disclosure.

FIG. 1B shows a data eye diagram example 170 for the signal 161 and an impedance characteristic example 180 for the non-linear reshape component 120 according to an embodiment of the disclosure.

The data eye diagram 170 has an upper peak of a relatively high voltage level, and a lower peak of a relatively low voltage level. In an example, the signal 161 uses the relatively high voltage level to transmit a binary bit "1", and use the relatively low voltage level to transmit a binary bit "0". Due to various noises, the voltage level of the upper peak varies, as shown by voltage variation 171, and the voltage level of the lower peak varies, as shown by voltage variation 172. The voltage variations 171 and 172 introduce jitter, as shown by jitter 173.

In the FIG. 1B example, the non-linear reshape component 120 can have the impedance characteristic 180 to reduce jitter. Specifically, when the voltage level of the signal 161 is at or near the upper peak, such as larger than an upper peak threshold voltage, the non-linear reshape component 120 has a relatively small impedance to apply a relatively large restriction influence to voltage change in the signal 161, and reduce the voltage variation 171. When the voltage level of the signal 161 is at or near the lower peak, such as smaller than a lower peak threshold voltage, the non-linear reshape component 120 also has a relatively small impedance to apply a relatively large restriction influence to voltage change in the signal 161, and reduce the voltage variation 172. When the voltage level of the signal 161 is away from the upper peak and the lower peak, such as smaller than the upper peak threshold voltage and higher than the lower peak threshold voltage, the non-linear reshape component 120 has a relatively large impedance to apply a relatively small restriction influence or no restriction influence to voltage change in the signal 161.

Figure 2:
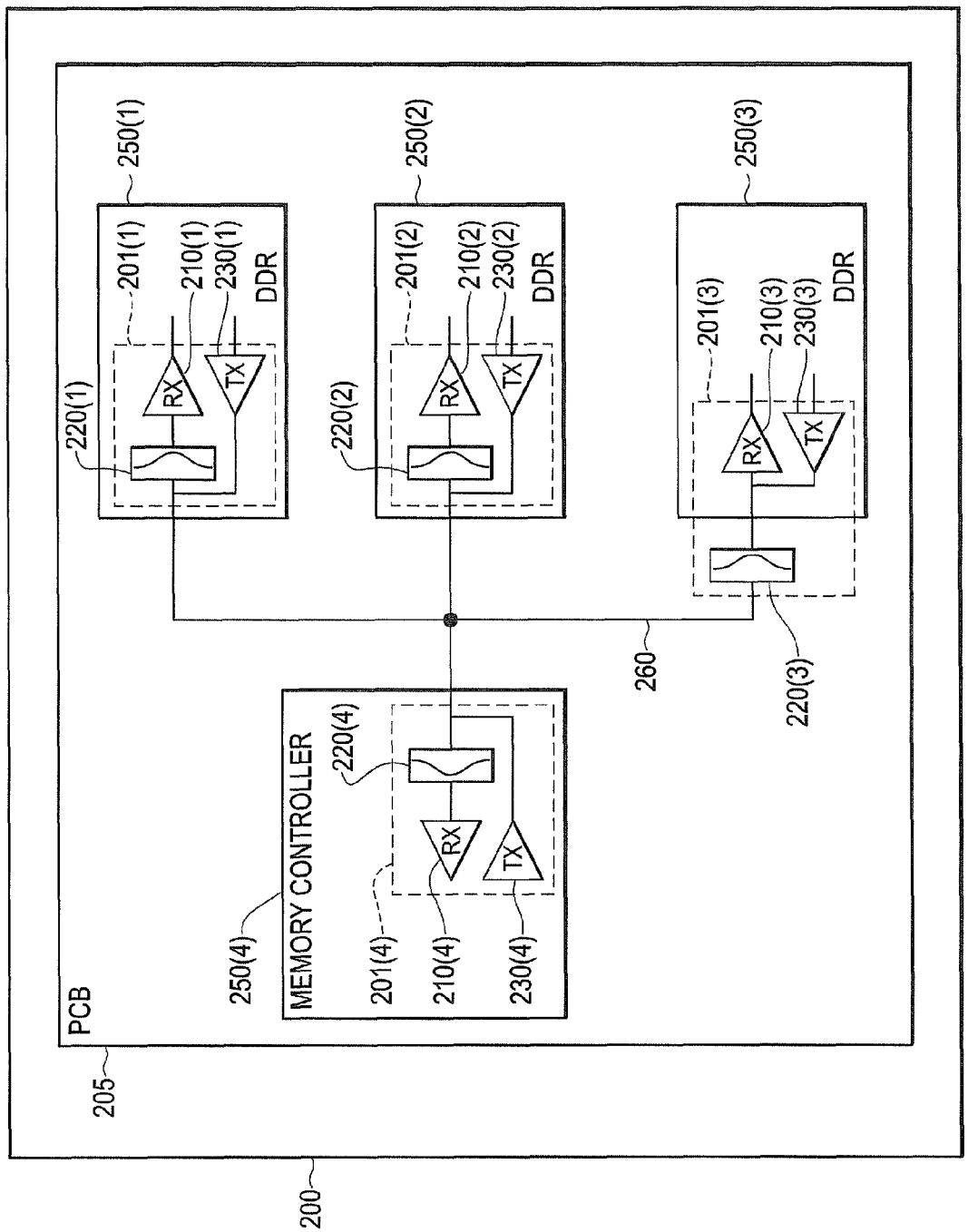
FIG. 2 shows a block diagram of an electronic system example 200 according to an embodiment of the disclosure.

FIG. 2 shows a block diagram of an electronic system example 200 according to an embodiment of the disclosure. The electronic system 200 includes a plurality of integrated circuit (IC) chips 250(1)-250(4) coupled together. Signals can be transmitted in-between the IC chips 250(1)-250(4). The electronic system 200 uses non-linear reshape components to reduce jitter introduced during signal transmission due to reflection noise and crosstalk noise, for example. In an example, some ICs in the system include the non-linear reshape components while other ICs do not.

In the FIG. 2 example, the electronic system 200 includes a printed circuit board (PCB) 205. The plurality of IC chips 250(1)-250(4) are mounted on the PCB 205, and are coupled together by conductive media, such as printed metal wires on the PCB 205, jumper wires, and the like. It is noted that, in another example, the electronic system 200 includes multiple PCB boards, and the plurality of IC chips are respectively mounted on one of the PCB boards. The plurality of IC chips is coupled together by printed metal wires on the PCB boards as well as suitable wires that interconnect the PCB boards.

In an embodiment, the plurality of IC chips 250(1)-250(4) perform high data rate transmission in-between the IC chips. In an example, the plurality of IC chips includes a plurality of double data rate (DDR) memories 250(1)-250(3), and a memory controller 250(4). The memory controller 250(4) and the plurality of DDR memories 250(1)-250(3) transmit various signals, such as control signals, address signals, clock signals, data signals, and the like, in between the IC chips. FIG. 2 shows a wire interconnection 260 that interconnects the memory controller 250(4) and the plurality of DDR memories 250(1)-250(3) together. The wire interconnection 260 transmits a data bit in a unit interval (UI), such as half of a CPU clock cycle.

According to an aspect of the disclosure, the wire interconnection 260 includes a plurality of transmission line loads at the IC chips 250(1)-(4). The transmission line loads generate reflection noise during signal transmission. Another possible reflection cause is the topology of the interconnect (e.g., bifurcated line, etc.) Further, according to an aspect of the disclosure, the electronic system 200 includes other wire interconnections (not seen) that are at least partially situated in a close proximity to the wire interconnection 260. Those wire interconnections can generate crosstalk noise during signal transmission. In an embodiment, the reflection noise and the crosstalk noise increase voltage variations at signal peaks, and increase jitter. The jitter reduces an available timing margin for signal processing at the receiver side, and can cause data error.

According to an embodiment of the disclosure, the electronic system 200 uses non-linear reshape components to reduce voltage variations at signal peaks and thus to reduce jitter. It is noted that the non-linear reshape components can be on-chip components, or off-chip components.

According to an embodiment of the disclosure, the electronic system 200 uses on-chip non-linear reshape components to reduce voltage variations at signal peaks to reduce jitter. In the FIG. 2 example, the DDR 250(1) includes an interface circuit 201(1) coupled to the wire interconnection 260. The interface circuit 201(1) includes a receiving circuit 210(1) and a non-linear reshape component 220(1). The receiving circuit 210(1) and the non-linear reshape component 220(1) are similarly configured as the receiving circuit 110 and the non-linear reshape component 120; the description of these components has been provided above and will be omitted here for clarity purposes. In addition, in an example, the interface circuit 201(1) includes a transmitter 230(1) configured to drive a signal onto the wire interconnection 260. Thus, the interface circuit 201(1) can be configured as an input circuit and an output circuit.

According to another embodiment of the disclosure, the electronic system 200 uses off-chip non-linear reshape components to reduce voltage variation at signal peaks to reduce jitter. In the FIG. 2 example, the PCB 205 includes a non-linear reshape component 220(3) disposed at a load of the wire interconnection 260. The load of the wire interconnection 260 is coupled to an interface circuit 201(3) of the DDR 250(3). The interface circuit 201(3) includes a receiving circuit 210(3) and a transmitter 230(3). The non-linear reshape component 220(3) can be similarly configured as the non-linear reshape component 120; the description has been provided above and will be omitted here for clarity purpose.

It is noted that the non-linear reshape components 220(1-4) can be configured differently in terms of impedance characteristics to best reshape the waveform of the signal in order to reduce jitter at each load.

In an example, the interface circuit 201(3) does not include an on-chip non-linear reshape component. The off-chip non-linear reshape component 220(3) is coupled to a transmission line 260 end that provides signal to the interface circuit 201 (3), and is configured to reduce voltage variation at signal peaks to reduce jitter. Thus, the receiving circuit 210(3) has sufficient timing margin to process the received signal from the wire interconnection 260.

Figure 3:
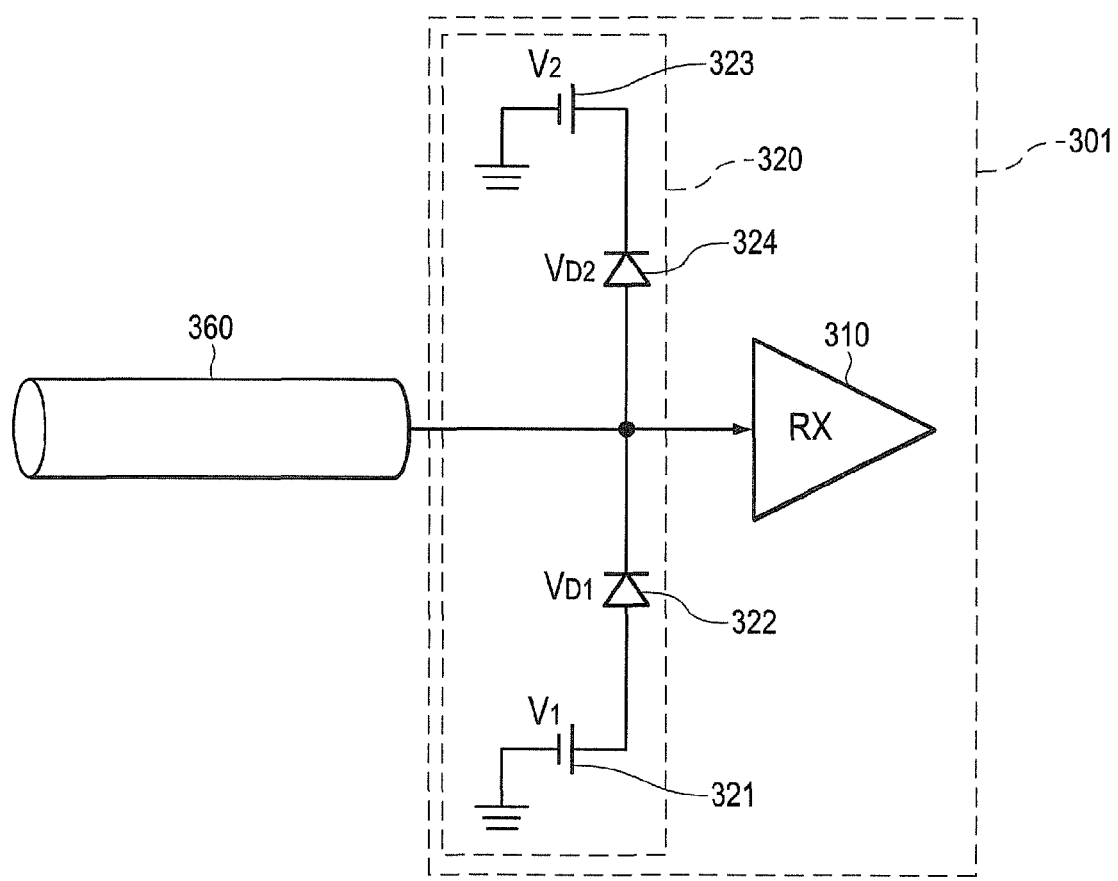
FIG. 3 shows a detailed block diagram of a non-linear reshape component 320 in an interface circuit 301 according to an embodiment of the disclosure.

FIG. 3 shows a detailed block diagram of a non-linear reshape component 320 in an interface circuit 301 according to an embodiment of the disclosure. The interface circuit 301 is coupled with a transmission line 360. The non-linear reshape component 320 non-linearly modifies a voltage level at a load of the transmission line 360. The non-linear reshape component 320 can be suitably used in the FIG. 1A and FIG. 2 examples. The non-linear reshape component 320 includes a first voltage source 321 providing a voltage V1, a first diode 322 having a forward voltage drop $V_{D1}$, a second voltage source 323 providing a voltage V2 and a second diode 324 having a forward voltage drop $V_{D2}$. These elements are coupled together as seen in FIG. 3.

According to an embodiment of the disclosure, the non-linear reshape component 320 includes two paths to respectively clip the voltage levels of the transmitted signal at the upper peak (e.g., the voltage level is higher than an upper peak threshold) and the lower peak (e.g., the voltage level is lower than a lower peak threshold). Specifically, the first voltage source 321 and the first diode 322 are coupled in series to form a first path at an end of the transmission line 360 to clip the voltage level of the transmitted signal at the lower peak; and the second voltage source 323 and the second diode 324 are coupled in series at the end of the transmission line 360 to clip the voltage level of the transmitted signal at the upper peak.

In an example, the transmission line 360 transmits a signal to the interface circuit 301. When the voltage at an end of the transmission line 360 is lower than a lower peak threshold $V1-V_{D1}$, the first diode 322 is forward biased that the voltage at the end of the transmission line 360 is modified by the first voltage source 321. Thus, the voltage at the non-linear reshape component 320 is clipped at $V1-V_{D1}$. When the voltage at the end of the transmission line 360 is higher than an upper peak threshold $V2+V_{D2}$, the second diode 324 is forward biased that the voltage at the end of the transmission line 360 is modified by the second voltage source 323. Thus, the voltage at the non-linear reshape component 320 is clipped at $V2+V_{D2}$. When the voltage is higher than $V1-V_{D1}$ and lower than $V2+V_{D2}$, the first diode 322 and the second diode 324 have high impedance and effectively separate the first voltage source 321 and the second voltage source 323 from affecting the voltage at the end of the transmission line 360.

In an example, the forward voltage drops $V_{D1}$ and $V_{D2}$ are about 0.25V, V1 is about 0.75, and V2 is about 0.65V, then the lower peak threshold is about 0.5V, and the upper peak threshold is about 0.9V.

According to an aspect of the disclosure, because the signal voltage is clipped at the lower peak threshold and the upper peak threshold, the voltage variations at the lower peak and the upper peak are reduced, and further the signal jitter is reduced.

Figure 4:
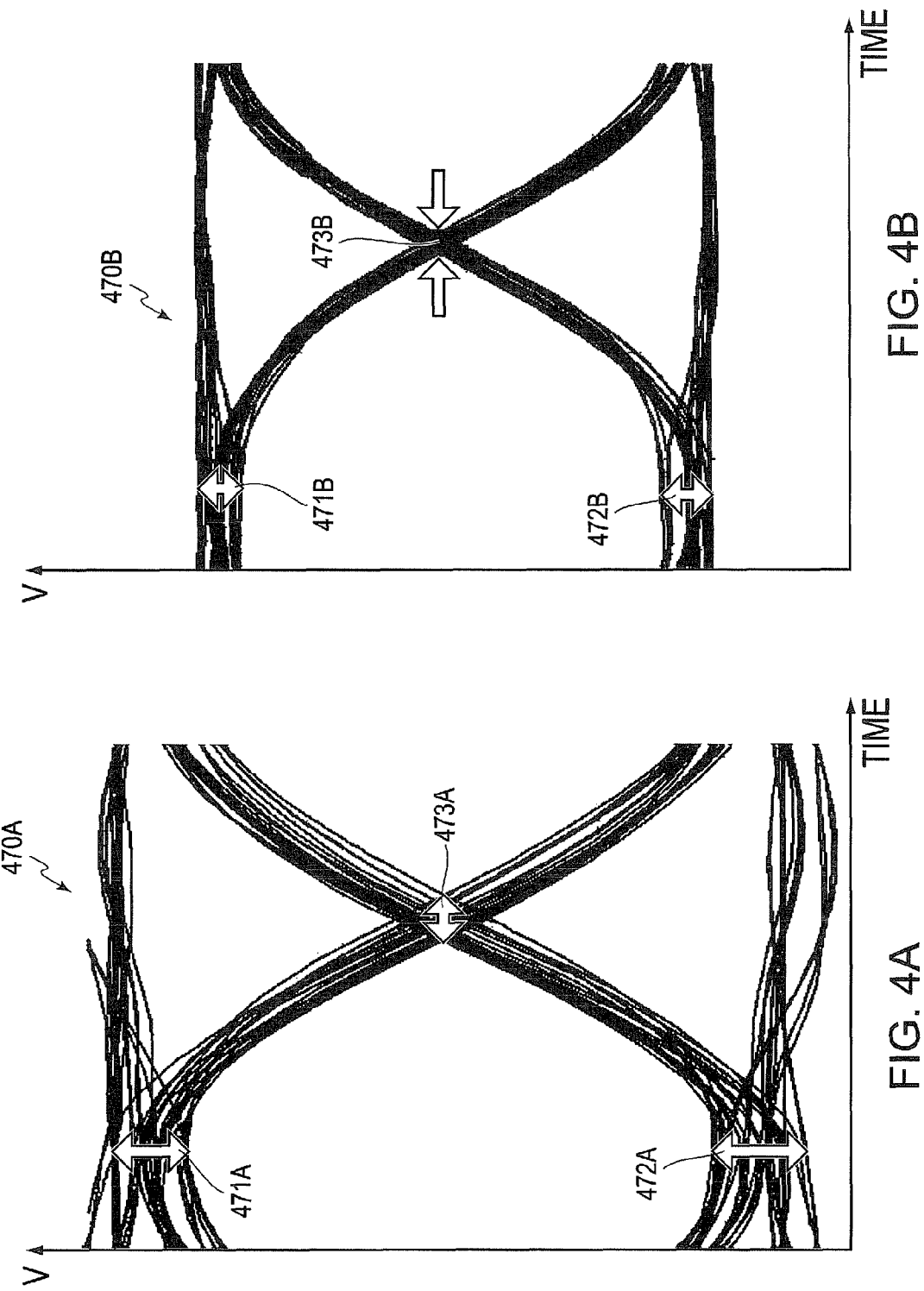
FIGS. 4A and 4B show eye diagrams 470A and 470B according to an embodiment of the disclosure.

FIG. 4A shows an eye diagram 470A at the end of the transmission line 360 without using the non-linear reshape component 320, and FIG. 4B shows an eye diagram 470B at the end of the transmission line 360 when the non-linear reshape component 320 is in use.

The eye diagram 470A has relatively large voltage variations at the upper peak and the lower peak, as shown by 471A and 472A. The relatively large voltage variations at the upper peak and the lower peak introduce relatively large jitter, as shown by 473A.

Because the non-linear reshape component 320 clips the signal voltage at the upper peak threshold and the lower peak threshold, the eye diagram 470B has relatively small voltage variations at the upper peak and the lower peak, as shown by 471B and 472B. The relatively small voltage variations introduce relatively small jitter, as shown by 473B.

Figure 5:
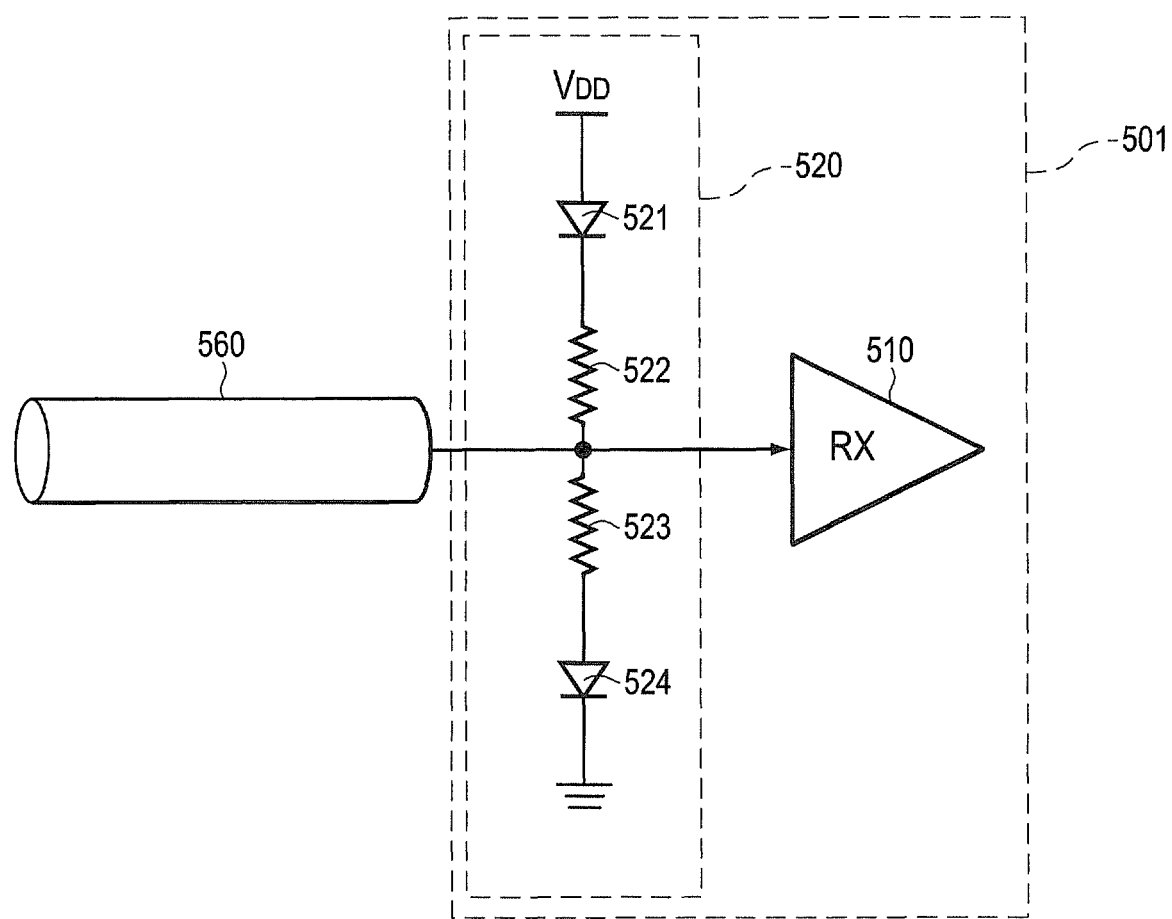
FIG. 5 shows another detailed block diagram of a non-linear reshape component 520 in an interface circuit 501 according to another embodiment of the disclosure.

FIG. 5 shows a detailed block diagram of a non-linear reshape component 520 in an interface circuit 501 according to an embodiment of the disclosure. The interface circuit 501 is coupled with a transmission line 560. The non-linear reshape component 520 causes a voltage level at the end of the transmission line 560 to be non-linearly modified. The non-linear reshape component 520 can be suitably used in the FIG. 1A and FIG. 2 examples. The non-linear reshape component 520 includes a first non-linear unit 521, a first resistor 522, a second non-linear unit 524 and a second resistor 523. These elements are coupled together as shown in FIG. 5.

According to an embodiment of the disclosure, the first non-linear unit 521 and the second non-linear unit 524 have relatively low impedance when the voltage drop on the unit is high, and thus apply relatively strong influence on the voltage level at the end of the transmission line 560. Further, the first non-linear unit 521 and the second non-linear unit 524 have relatively high impedance when the voltage drop on the unit is low, and thus apply relatively weak influence on the voltage level at the end of the transmission line 560. In an example, the first non-linear unit 521 and the second non-linear unit 524 are diodes. In another example, the first non-linear unit 521 and the second non-linear unit 524 are diode-connected transistors.

In an example, when the voltage level at the end of the transmission line 560 is lower than 0.5V for example, a relatively large voltage drop is applied on the first non-linear unit 521, and the first non-linear unit 521 has relatively low impedance and applies relatively strong influence on the voltage level at the end of the transmission line 560 to reduce voltage variation at the lower peak. In an example, the influence strength is a function of the sum of the turn-on resistance of first non-linear unit 521, such as a diode or a transistor, and the resistance of the first resistor 522.

Similarly, when the voltage level at the end of the transmission line 560 is higher than 0.9V for example, a relatively large voltage drop is applied on the second non-linear unit 524, and the second non-linear unit 524 has relatively low impedance and applies a relatively strong influence on the voltage level at the end of the transmission line 560 to reduce voltage variation at the upper peak. In an example, the influence strength is a function of the sum of the turn-on resistance of the second non-linear unit 524, such as a diode or a transistor, and the resistance of the second resistor 523.

When the voltage level at the end of the transmission line 560 is between 0.5V and 0.9V for example, the voltage drop on the first non-linear unit 521 and the voltage drop on the second non-linear unit 524 are relatively low, thus the first non-linear unit 521 and the second non-linear unit 524 have relatively high impedance, and apply relatively weak influence or no-influence on the voltage level at the end of the transmission line 560. Thus, the peak-to-peak amplitude of the signal at the end of the transmission line 560 is not significantly affected.

It is noted that, in an example, the non-linear reshape component 520 uses existing voltage supplies, such as on-chip voltage supply VDD and ground.

It is also noted, in an example, the parameters of the first and second non-linear units 521 and the 524, such as turn-on resistance, forward voltage drop, threshold voltage, and the like, and the resistance of the first and second resistors 522 and 523 are suitable determined to achieve suitable parameters of the non-linear reshape component 520, such as impedance characteristic, peak-to-peak amplitude, and the like.

It is also noted that the non-linear reshape component 520 can be suitable changed. In an example, the first non-linear unit 521 and the first resistor 522 swap positions. In another example, the second non-linear unit 524 and the second resistor 523 swap positions.

According to an aspect of the disclosure, because the voltage variations at the lower peak and the upper peak are reduced, and the signal jitter introduced by the peak voltage variations is also reduced. In an example, the eye diagram at the end of the transmission line 560 is similar to the eye diagram 470B.

Figure 6:
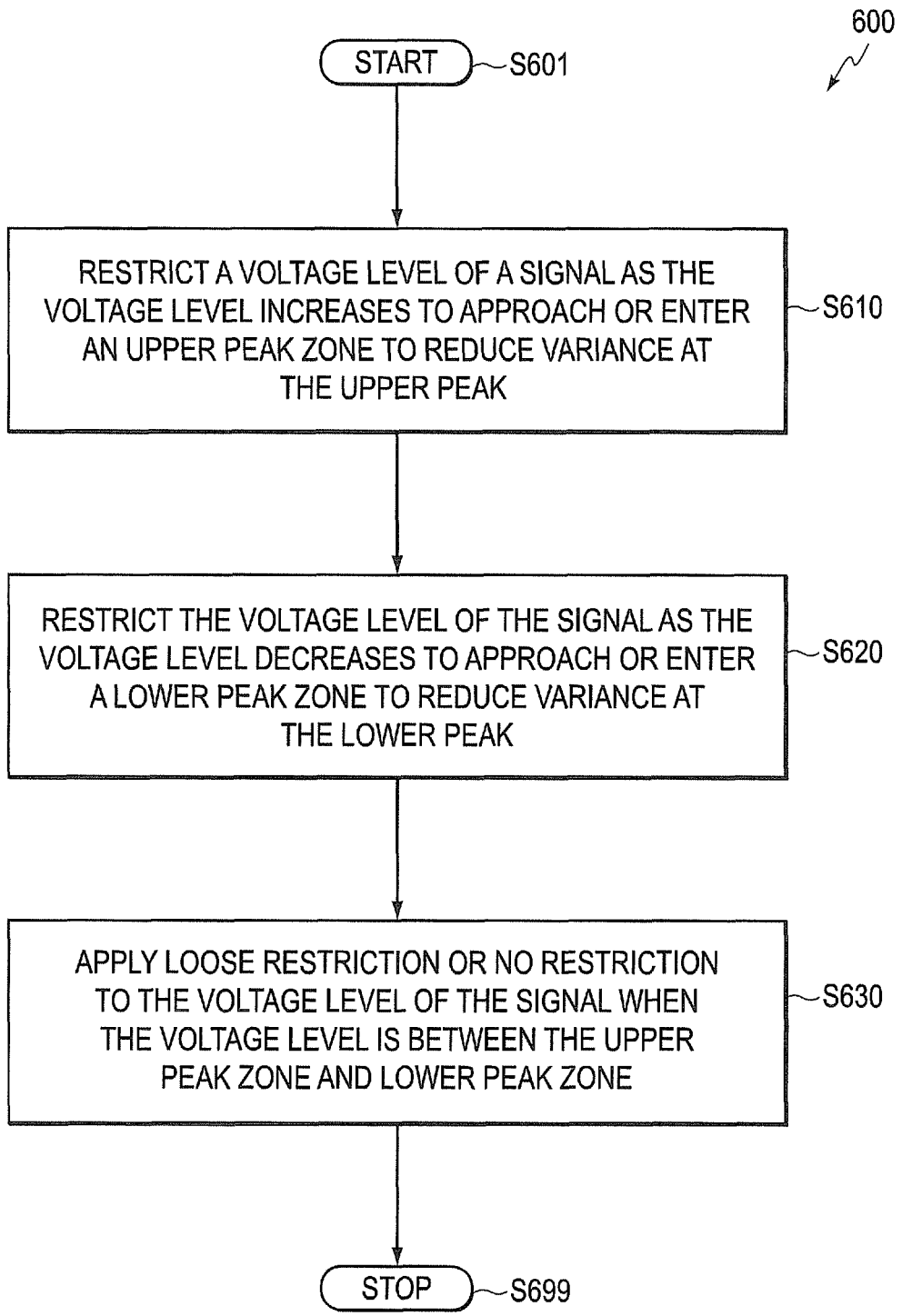
FIG. 6 shows a flowchart outlining a process example 600 according to an embodiment of the disclosure.

FIG. 6 shows a flowchart outlining a process example 600 for the non-linear reshape component 120 to non-linearly modify the voltage on the load of the transmission line 160, and thus reshape the signal waveform according to an embodiment of the disclosure. The process starts at S601, and proceeds to S610.

At S610, the non-linear reshape component 120 restricts the voltage level of the signal as the voltage level increases to approach or enter an upper peak zone, such as higher than an upper voltage threshold, to reduce variance at the upper peak. In an example, the non-linear reshape component 120 clips the voltage level at the upper voltage threshold to reduce variance at the upper peak. In another example, the non-linear reshape component 120 has a relatively low impedance to modify the voltage level when the voltage level is in the upper peak zone.

At S620, the non-linear reshape component 120 restricts the voltage level of the signal as the voltage level decreases to approach or enter a lower peak zone, such as lower than a lower voltage threshold, to reduce variance at the lower peak. In an example, the non-linear reshape component 120 clips the voltage level at the lower voltage threshold to reduce variance at the lower peak. In another example, the non-linear reshape component 120 has a relatively low impedance to modify the voltage level when the voltage level is in the lower peak zone.

At S630, the non-linear reshape component 120 applies loose restriction or no restriction to the voltage level of the signal when the voltage level is in neither of the upper peak zone and the lower peak zone. In another example, the non-linear reshape component 120 has a relatively high impedance to modify the voltage level when the voltage level is in neither of the upper peak zone and the lower peak zone. Then the process proceeds to S699, and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   causing a voltage level of an electrical signal transmitted on a transmission line to be non-linearly modified to reduce a voltage variation that occurred during transmission at a target level; and
   providing the modified signal to a receiving circuit that is disposed on the transmission line.

2. The method of claim 1, wherein causing the voltage level of the signal transmitted on the transmission line to be non-linearly modified to reduce the voltage variation at the target level further comprises:
   causing the voltage level of the signal transmitted on the transmission line to be non-linearly modified to reduce a first voltage variation at a first target level corresponding to a first digital value and to restrict a second voltage variation at a second target level corresponding to a second digital value.

3. The method of claim 1, wherein causing the voltage level of the signal transmitted on the transmission line to be non-linearly modified to reduce the voltage variation at the target level further comprises:
   clipping the voltage level of a predetermined voltage value at the target level.

4. The method of claim 1, wherein causing the voltage level of the signal transmitted on the transmission line to be non-linearly modified to reduce the voltage variation at the target level further comprises:
   reducing an impedance to modify the voltage level of the signal at the target level.

5. The method of claim 1, wherein causing the voltage level of the signal transmitted on the transmission line to be non-linearly modified to reduce the voltage variation at the target level further comprises:
   using at least one of a diode and a transistor to cause the voltage level of the signal to be non-linearly modified.

6. The method of claim 1, wherein causing the voltage level of the signal transmitted on the transmission line to be non-linearly modified to reduce the voltage variation at the target level further comprises:
   using a circuit disposed with the receiving circuit on an integrated circuit chip to cause the voltage level of the signal to be non-linearly modified.

7. The method of claim 1, wherein causing the voltage level of the signal transmitted on the transmission line to be non-linearly modified to reduce the voltage variation at the target level further comprises:
   using a circuit disposed outside of an integrated circuit chip to cause the voltage level of the signal to be non-linearly modified.

8. A circuit, comprising:
   a receiving circuit configured to receive an electrical signal transmitted on a transmission line; and
   a non-linear reshape circuit element configured to cause a voltage level of the signal to be non-linearly modified to reduce a voltage variation that occurred during transmission at a target level.

9. The circuit of claim 8, wherein the non-linear reshape circuit element is configured to cause the voltage level of the signal to be non-linearly modified to reduce a first voltage variation at a first target level corresponding to a first digital value and to reduce a second voltage variation at a second target level corresponding to a second digital value.

10. The circuit of claim 8, wherein the non-linear reshape circuit element further comprises:
a voltage source coupled with a diode to clip the voltage level of a predetermined voltage value at the target level.

11. The circuit of claim 8, wherein the non-linear reshape circuit element is configured to reduce an impedance to modify the voltage level at the target level.

12. The circuit of claim 8, wherein the non-linear reshape circuit element further comprises:
at least one of a diode and a diode-connected transistor configured to have an impedance as a function of a voltage drop.

13. The circuit of claim 8, wherein the non-linear reshape circuit element and the receiving circuit are disposed on an integrated circuit chip.

14. The circuit of claim 8, wherein the receiving circuit is disposed on an integrated circuit chip and the non-linear reshape circuit element is disposed outside of the integrated circuit chip.

15. An integrated circuit (IC) chip, comprising:
a receiving circuit configured to receive an electrical signal transmitted into the IC chip; and
a non-linear reshape circuit configured to cause a voltage level of the signal to be non-linearly modified to reduce a voltage variation that occurred during transmission at a target level.

16. The IC chip of claim 15, wherein the non-linear reshape circuit element is configured to cause the voltage level of the signal to be non-linearly modified to reduce a first voltage variation at a first target level corresponding to a first digital value and to reduce a second voltage variation at a second target level corresponding to a second digital value.

17. The IC chip of claim 15, wherein the non-linear reshape circuit element further comprises:
a voltage source coupled with a diode to clip the voltage level of a predetermined voltage value at the target level.

18. The IC chip of claim 15, wherein the non-linear reshape circuit element is configured to reduce an impedance to modify the voltage level at the target level.

19. The IC chip of claim 15, wherein the non-linear reshape circuit element further comprises:
at least one of a diode and a diode-connected transistor configured to have an impedance as a function of a voltage drop.

20. The IC chip of claim 15, wherein the IC chip is a double data rate (DDR) memory chip.

* * * * *